United States Patent

[11] 3,608,825

[72] Inventor  Richard F. Reinke
                P. O. Box 272, Deshler, Nebr. 68340
[21] Appl. No. 850,177
[22] Filed     Aug. 14, 1969
[45] Patented  Sept. 28, 1971

[54] LINEAR IRRIGATION SYSTEM WITH WATER TANK
     11 Claims, 13 Drawing Figs.
[52] U.S. Cl. ........................................... 239/148,
                    239/212, 137/581, 137/44
[51] Int. Cl. ............................................ B05b 9/00
[50] Field of Search ................................ 239/146,
        147, 148, 159, 212, 172; 141/231, 250; 214/42 R,
        42 X; 180/79; 104/169; 137/577, 577.5, 578, 579,
                                                    580, 581

[56]              References Cited
                UNITED STATES PATENTS
1,079,817  11/1913  Williamson .................... 239/148
1,321,350  11/1919  Alvarez ......................... 239/212 X
1,803,248   4/1931  Hack ............................. 239/159
2,332,007  10/1943  Parker .......................... 137/581 X
2,744,785   5/1956  Lundegreen ................... 239/212 X
2,931,579   5/1960  Ruddell ......................... 239/212 X
3,186,493   6/1965  Barry ............................ 104/169 X
3,202,361   8/1965  Kane ............................. 239/212
3,415,335  12/1968  Wise ............................. 180/79
3,444,941   5/1969  Purtell .......................... 239/212
3,498,314   3/1970  Gheen ........................... 239/212

Primary Examiner—M. Henson Wood, Jr.
Assistant Examiner—Edwin D. Grant
Attorneys—Clarence A. O'Brien and Harvey B. Jacobson ABSTRACT: An elongated sprinkler-equipped pipe supported in elevated position transversely above an area to be irrigated and movable in a linear manner back and forth between the ends of the area to be irrigated. A water supply pipe is provided for discharging water into a water supply tank carried by a driving and supporting tractor assembly at a plurality of intervals along the length of the pipe. The tractor includes a pump mounted thereon for supplying water to the sprinkler pipe and includes a drive mechanism for driving a plurality of carriages spaced along the sprinkler pipe with the tractor and carriages being retained in substantially aligned condition by timing cam assemblies associated with the wheels on the tractor and carriages.

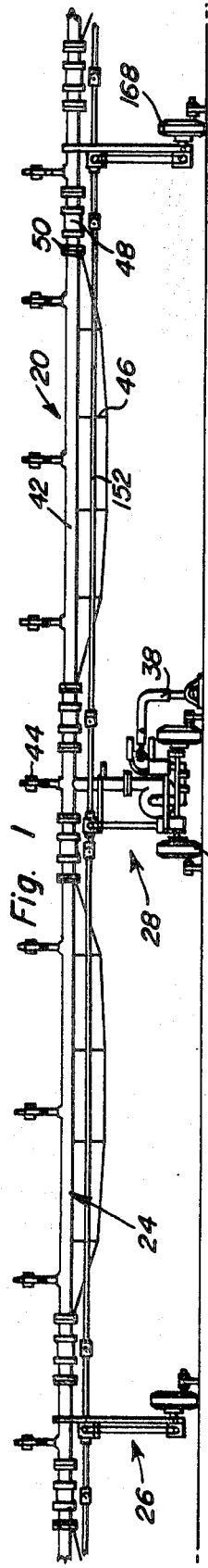
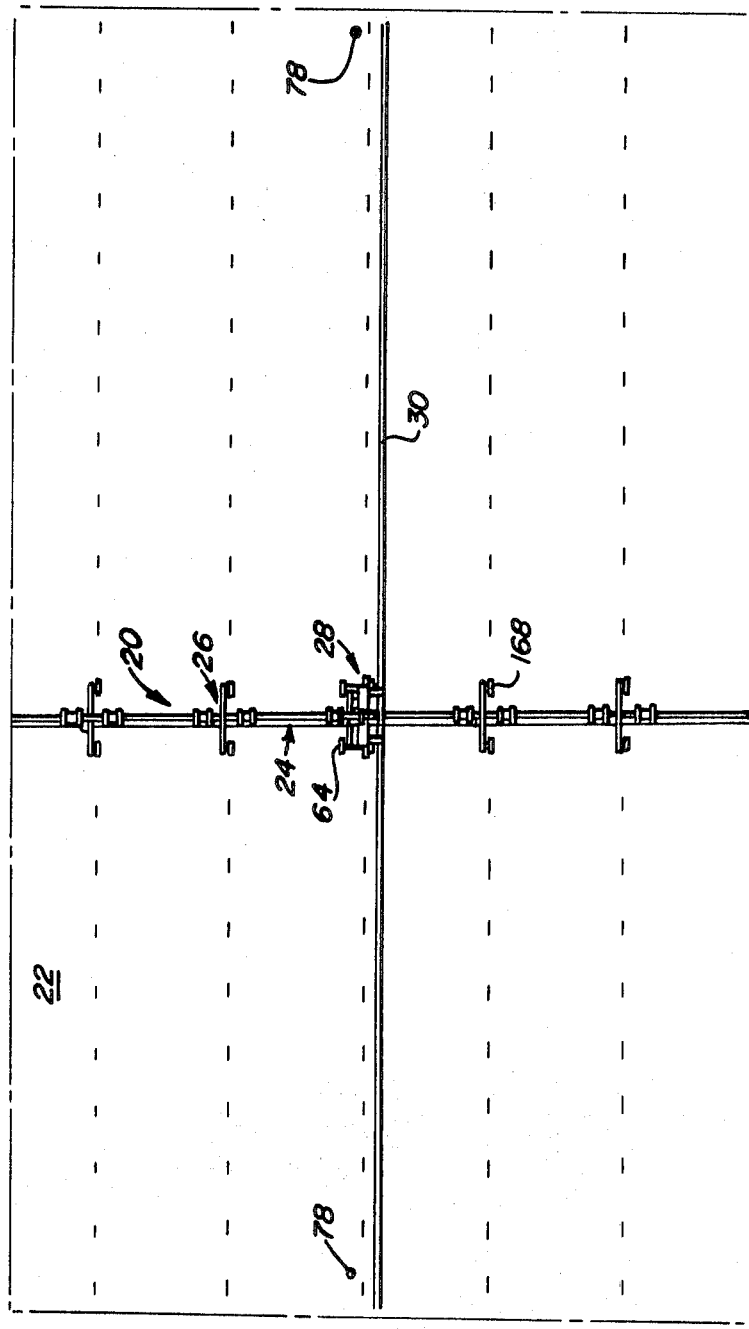

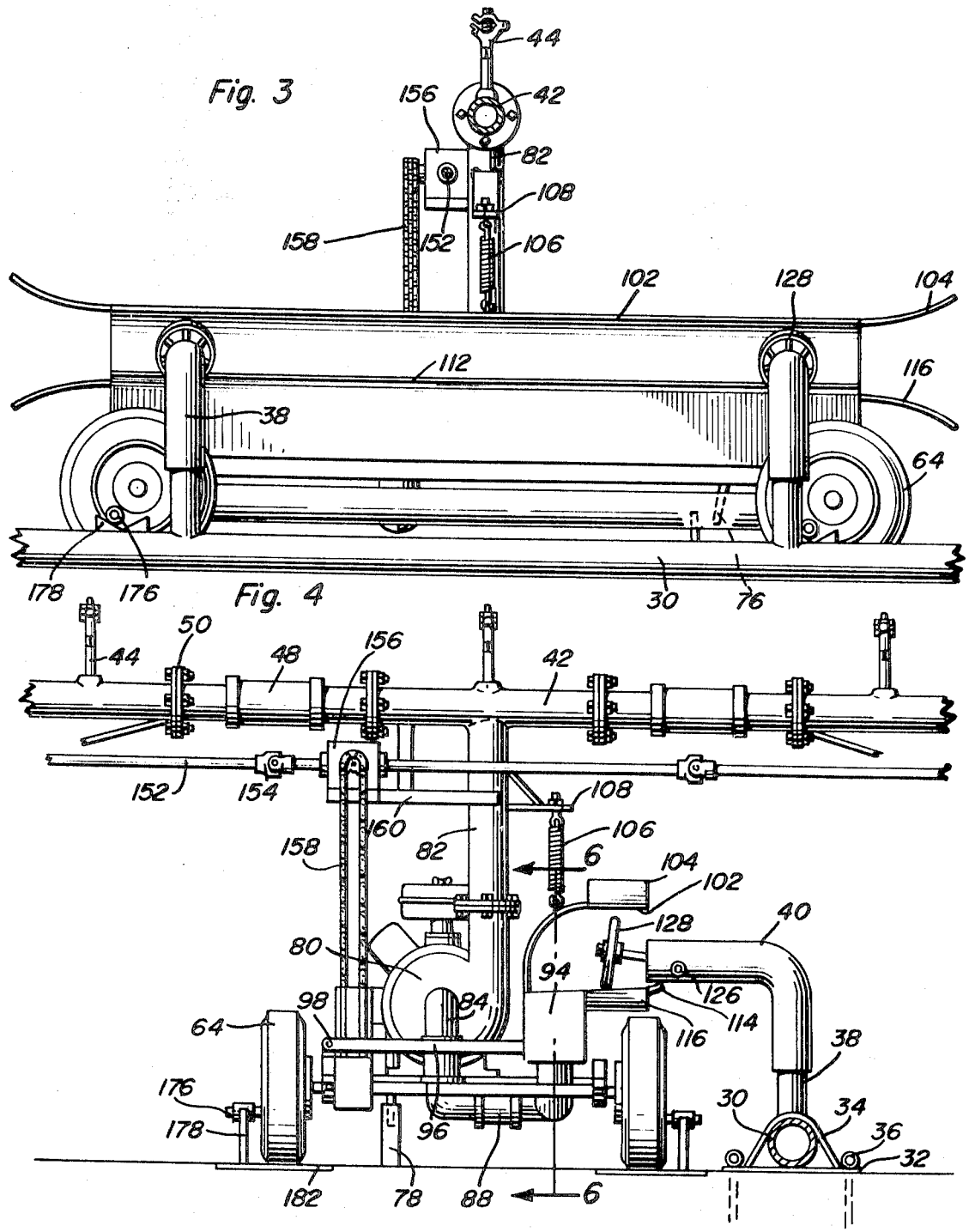

Richard F. Reinke
INVENTOR

Richard F. Reinke
INVENTOR

BY Clarence A. O'Brien
and Harvey B. Jackson
Attorneys

Richard F. Reinke
INVENTOR.

BY *Clarence A. O'Brien
and Harvey B. Jacobson*
Attorneys

LINEAR IRRIGATION SYSTEM WITH WATER TANK

BACKGROUND OF THE INVENTION

1. Field of the Invention

The present invention generally relates to an irrigation system including an elongated sprinkler pipe supported and driven in a linear manner between the ends of an area to be irrigated together with a supporting and driving tractor and carriages for the pipe with the tractor being driven alongside of a supply pipe and including a water tank thereon receiving water from the supply pipe with a float control arrangement being provided to assure a constant supply of water to the pump on the tractor.

2. Description of the Prior Art

Prior irrigation devices involve an elongated sprinkler pipe having a plurality of sprinklers mounted thereon for discharging water over a particular area. Most commercially available irrigation devices include a sprinkler pipe which rotates about an axis defined by a stationary standpipe at one end thereof. Examples of such devices are found in U.S. Pat. No. 2,604,359, issued July 22, 1952, U.S. Pat. No. 3,394,729, issued July 30, 1968 and in my copending application, Ser. No. 792,013, filed Jan. 17, 1969 for Electrically Driven Circular Irrigation System. Due to various factors, including but not limited to the failure of circular irrigation systems to irrigate the corners of square areas and the fact that circular tracks are made by the supporting carriages, some efforts have been made to provide a sprinkler apparatus which will move in a linear path from end to end of an area to be irrigated. Examples of such devices are found in U.S. Pat. No. 1,068,796, issued July 29, 1913 and my copending application Ser. No. 838,089, filed July 1, 1969, for "Linear Irrigation System with Pickup Shoe."

SUMMARY OF THE INVENTION

An object of the present invention is to provide a linear irrigation system having a tractor and a plurality of driven carriages supporting an irrigation pipe which extends transversely of an area to be irrigated and moves the pipe back and forth between the ends of the area to be irrigated in which the tractor is provided with a spring supported water tank receiving water from a plurality of discharge assemblies incorporated into a water supply pipe extending from end to end of the area being irrigated alongside of the tractor so that a pump on the tractor and communicated with the irrigation pipe will be provided with a supply of water from the water tank.

Another object of the invention is to provide an irrigation system in accordance with the preceding object in which the water tank is provided with a float valve adjacent each end thereof communicated with an interconnecting manifold that is communicated with the intake of the pump to assure water supply even when the tractor may be tilted or traversing rough terrain.

Still another object of the invention is to provide an irrigation system in accordance with the preceding objects in which the discharge assemblies on the supply pipe are spaced apart a distance less than the length of the water tank so that there will always be a supply of water available to the tank during its movement along the supply pipe.

A further important object of the present invention is to provide an irrigation system in accordance with the preceding objects in which the tractor is provided with a prime mover for driving a pump and driving the tractor and carriages which includes a reversing mechanism provided with the trip lever to engage a stake or other abutment in the area to be irrigated so that the irrigation device will be automatically reversed when it reaches the end of he area to be irrigated.

A still further important feature of the invention is to provide an irrigation system in which the tractor and carriages are driven by a single prime mover and cam aligning means is provided for retaining the carriages and tractor in alignment.

Another significant object of the invention is to provide an irrigation system in accordance with all of the preceding objects which is relatively simple in construction, easy to construct, maintain and operate, easy to control and efficient in operation to provide proper irrigation at a relatively low cost per acre

BRIEF DESCRIPTION OF DRAWINGS

FIG. 1 is an end elevational view of the tractor and adjacent carriages illustrating the association thereof and the association of the sprinkler pipe therewith.

FIG. 2 is a top plan view of the irrigation device illustrating the association thereof with an area to be irrigated.

FIG. 3 is a side elevational view of the tractor and supply pipe illustrating the structure of the water tank and its association with the valves for the standpipes extending from the supply pipe.

FIG. 4 is an end elevational view of the construction of FIG. 3 illustrating further structural details of the tractor, standpipes, water tank and pump.

DESCRIPTION OF THE PREFERRED EMBODIMENTS

Figure 5:
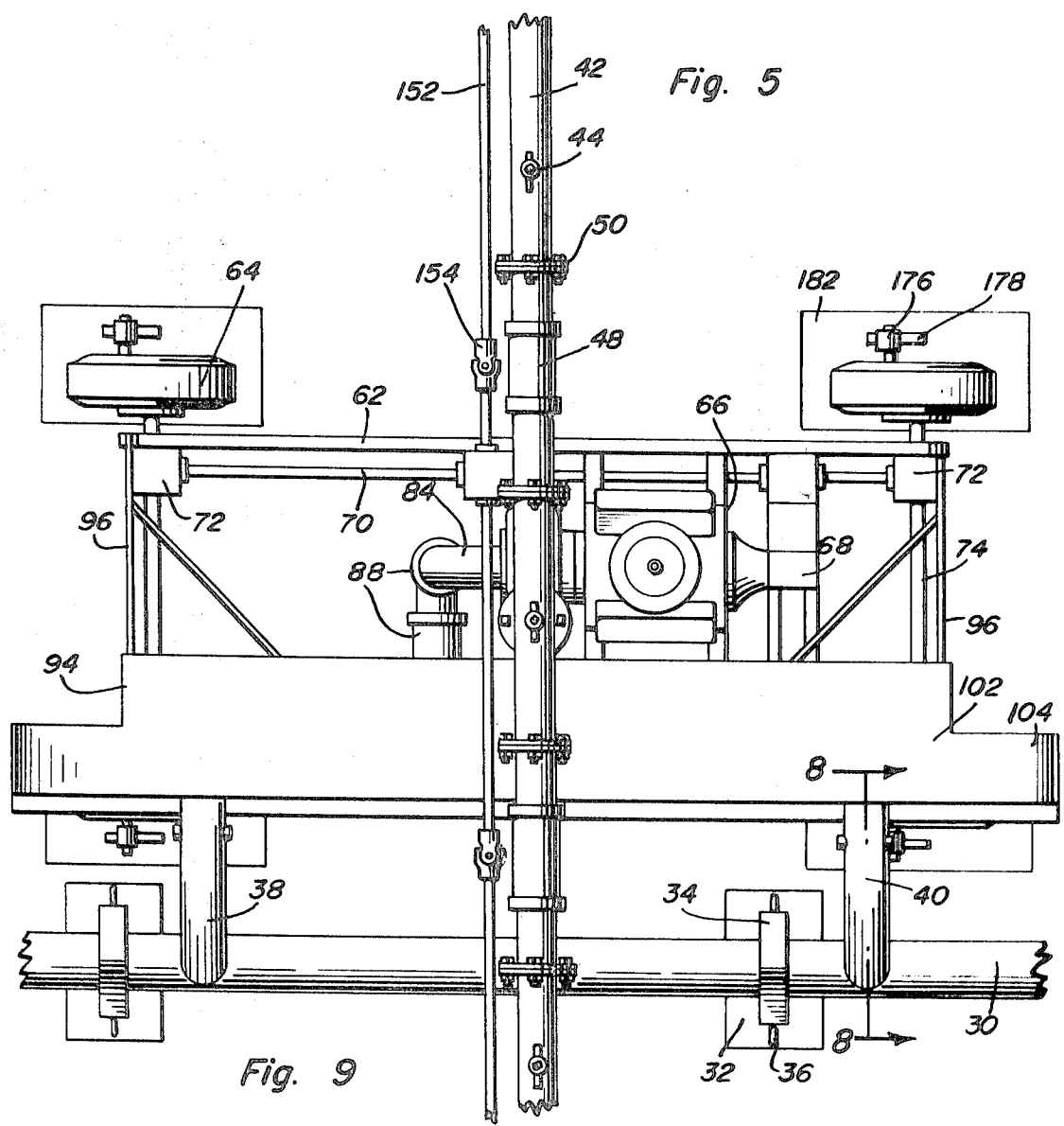
FIG. 5 is a top plan view of the construction of FIGS. 3 and 4.

The irrigation system of the present invention is generally designated by the numeral 20 and is oriented in transverse relation to an area to be irrigated such as the rectangular field 22 as illustrated in FIG. 2 with the irrigation device 20 moving in a back and forth linear path between the ends of the field 22. The irrigation device includes an elongated irrigation pipe or boom 24 supported and driven by a plurality of spaced carriages 26 and a single tractor 28 providing a source of power for propelling the irrigation device and pumping water to the irrigation pipe 24. The tractor 28 moves parallel to and alongside of a water supply pipe 30 extending throughout the length of the field 22 and communicated with a pump, well or the like to provide a source of pressurized water to the irrigation device 20. The supply pipe 32 may be of any suitable material, shape and configuration and supported on, above or below the ground surface in any suitable manner such as by supporting plates 32, holddown straps 34 and anchor members 36. The supply pipe 30 is provided with a plurality of longitudinally spaced standpipes 38 having a horizontally disposed upper end 40 extending laterally of the supply pipe 30. The association of two of the standpipes is illustrated in FIG. 3 with the association and configuration of the standpipe 38 being illustrated in FIG. 4. It is pointed out that the standpoints 38 are spaced continuously along the length of the supply pipe 30.

Figure 13:
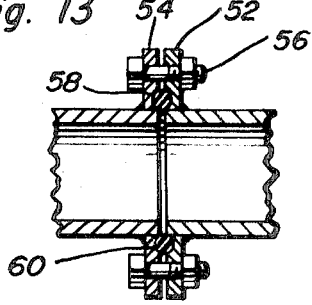
FIG. 13 is a detailed sectional view illustrating the sealed flange coupling between adjacent sections of the irrigation pipe.
Figure 12:
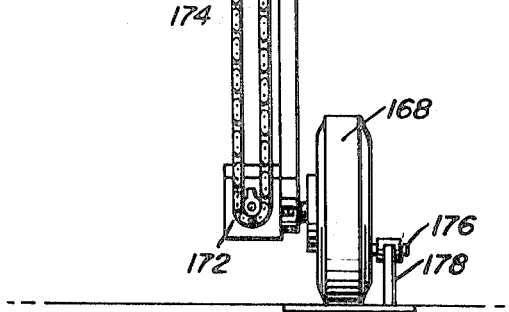
FIG. 12 is an end elevational view of the carriage.

The irrigation pipe or boom includes an elongated sprinkler pipe 42 having a plurality of sprinkler assemblies 44 mounted thereon in spaced relation. The pipe 42 is divided into a plurality of sections with each section having a truss construction 46 associated therewith and a flexible coupling 48 as well as a flanged coupling 50 to interconnect the sections with the flexible coupling 48 articulately interconnecting the pipe sections. The details of the irrigation pipe 42, the truss assembly 46 and the flexible couplings 48 are disclosed in my copending application, Ser. No. 792,013, filed Jan. 17, 1969. FIG. 13 discloses the details of the flanged coupling 50 in which the adjacent ends of adjacent pipe sections are provided with flanges 52 and 54 interconnected by a plurality of bolts 56. The facing surfaces of the flanges 52 and 54 are each provided with a peripheral groove 58 of substantially semicircular configuration for receiving an O-ring seal 60 therein. By providing grooves 58 in both of the flanges 52 and 54, the O-ring seal will be forced outwardly against the outer peripheral portions of the grooves when water pressure engages the inner periphery of the O-ring seal 60 thus forming a more effective seal for the flanged coupling 50.

The tractor 28 includes a supporting frame structure 62 supported by four corner wheels 64 which are driven by a suitable prime mover such as an internal combustion engine 66 or an equivalent power source mounted on the frame 62 in a conventional and well-known. The prime mover drives the wheels 64 through a reversing transmission 68 and a drive shaft 70 which is connected to gear boxes 72 that drive the supporting axles 74 for the wheels 64 in any suitable manner. The reversing transmission 68 is provided with a depending reverse lever 76 which reverses the output direction of the drive shaft 70 which extends forwardly and rearwardly from the transmission 68. The lever 76 depends into a position for engagement by an abutment or stop member 78 which may be in the form of a stake disposed adjacent each end of the field 22 so that the direction of rotation of the tractor and the direction of rotation of the drive shaft 70 will be automatically reversed when the irrigation device reaches the limit of its movement in one direction of travel and the trip lever 76 engages the stake 78 and is tripped thereby. This construction provides for automatic reversing of the irrigation device at each end of the field 22.

The engine 66 also drives a water pump 80 supported by the frame 62 in any suitable manner which is of any suitable type and construction but preferably of the centrifugal type having an upwardly extending discharge pipe 82 connected thereto and connected to the pipe 42 to facilitate support of the pipe 42. The discharge pipe 82 not only communicates the pump 80 with the pipe 42 but also serves as a support therefor. The pump 80 is also provided with an intake pipe 84 communicating with the center of the pump with the intake pipe 84 being communicated with a longitudinally extending intake manifold 86 by virtue of the use of a flexible coupling or insert 88 which enables some degree of movement of the manifold 86 in relation to the intake pipe 84.

The intake manifold 86 has upturned ends 90 which are fixed to and communicated through the bottom wall 92 of an elongated tank 94 which extends substantially throughout the length of the tractor and for a distance slightly greater than the distance between two adjacent standpipes 38 as illustrated in FIG. 3.

The tank 94 is disposed longitudinally of the frame 62 adjacent the side thereof nearest the supply pipe 30. Extending laterally from the inner wall of the tank 94 is a pair of elongated mounting brackets 96 therefor which are pivotally connected to the frame 62 by a pivot pin or bolt 98 thus enabling movement of the tank 94 in a vertical swinging direction in relation to the frame 62 about an axis defined by the longitudinally aligned pivot pins or bolts 98. The top edge of the inner wall of the tank 94 is provided with an upwardly and outwardly curved extension 100 terminating in an upper guide member 102 which is continuous throughout the length of the tank 94 and extends longitudinally beyond each end of the tank 94 with the extending ends of the upper guide 102 being upwardly curved as indicated at 104 for a purposed described hereinafter. The central area of the tank wall extension 100 is supported by a tension coil spring 106 from a bracket 108 attached to the discharge pipe 82 of the pump 80 as illustrated in FIG. 4 thus resiliently supporting the tank to enable it to move vertically by elongating or shortening the spring 106 depending upon the quantity of water 110 in the tank. When the tank is substantially full of water, the spring 106 will be elongated whereas the spring will be shortened when the tank is substantially empty of water 110 thereby providing a floating support for the tank 94 with the single spring 106 and the pair of mounting arms 96 which maintains the tank and the top guide 102 longitudinally aligned with the frame 62.

Figure 8:
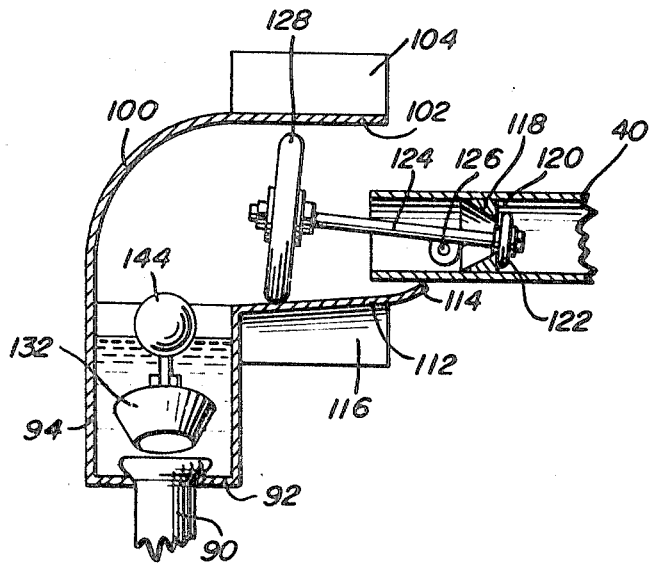
FIG. 8 is a detailed sectional view taken substantially upon a plane passing along section line 8—8 of FIG. 5 illustrating the control valve for the discharge standpipe and its relationship to the water tank and actuating mechanism for the control valve.
Figure 10:
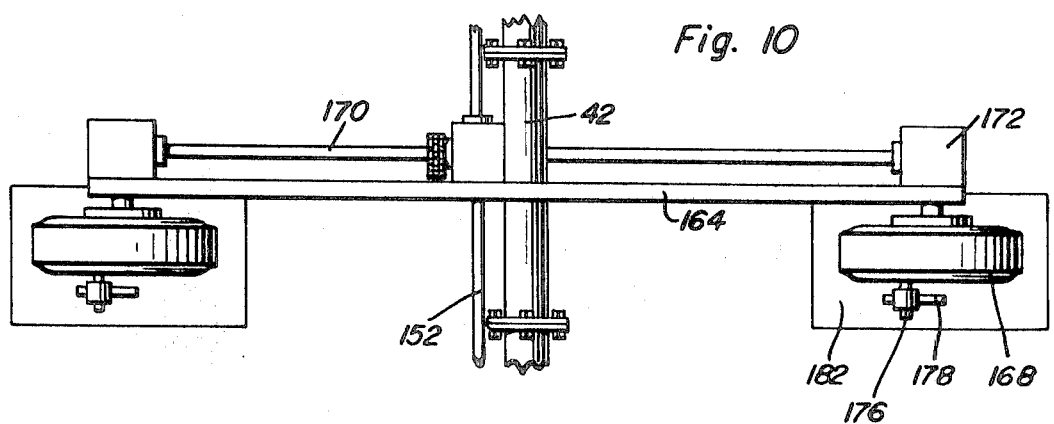
FIG. 10 is a plan view of one of the carriages for the irrigation pipe.
Figure 11:
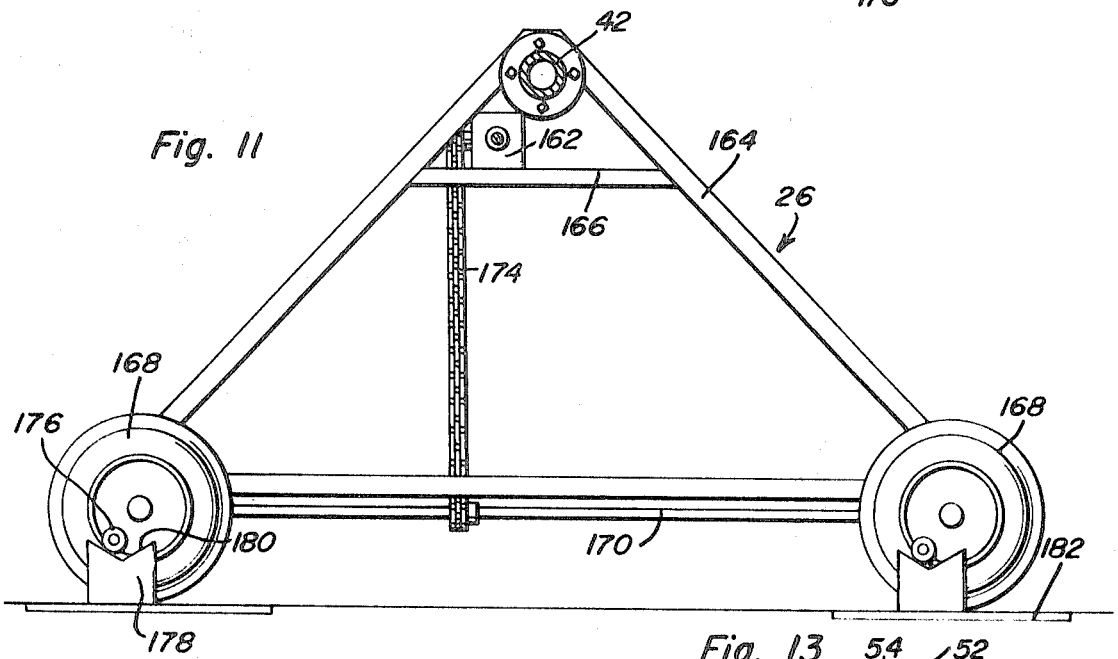
FIG. 11 is a side elevational view of the carriage of FIG. 10.

The outer wall of the tank 94 is also provided with an upwardly inclined laterally extending extension 112 which has a slightly upwardly curved terminal lip 114 along the free edge thereof to form a lower guide in opposed and generally parallel relation to the upper guide 102 as illustrated in FIG. 8. Each end of the lateral extension 112 is provided with a longitudinal extension which is downwardly curved as at 116 and is in general alignment with the upwardly curved end 104 of the upper guide 102. Also, as illustrated in FIG. 8, the lip 114 underlies and is disposed longitudinally inwardly of the free end of the horizontal portion 40 of the standpipe 38 so that water exiting from the pipe 38 will be guided down the slightly inclined guide surface of the lower guide 112 into the tank 94.

As illustrated in FIG. 8, the horizontal portion of the standpipe 40 is pivoted with an annular valve seat 118 therein spaced inwardly from the free end which has a substantially flat inner surface 120 engaged by a rocking valve member 122. The valve member 122 is mounted on the end of a shaft or rod 124 that is pivotally supported from a pivot bolt or pin 126 extending transversely of the standpipe 40 between the annular valve seat 118 and the free end thereof so that rocking movement of the shaft or rod 124 will open the valve 122 or permit it to close by gravity with the valve member 122 being constructed of a resilient material to close the opening through the valve seat 118 when the outer end of the shaft or rod 124 is not supported in an elevated position as illustrated in FIG. 8.

For supporting the outer end of the shaft or rod 124, there is a wheel rotatably mounted thereon with the wheel being designated by the numeral 128 and being of the spoked type so that water exiting from the standpipe 40 may flow through the wheel 128 inasmuch as the wheel 128 is in alignment with but yet spaced from the free end of the standpipe 40. The wheel 128 rollingly engages the lower guide 112 and when it is engaging the upper surface of the lower guide 112, it is elevated thus elevating the outer end of the rod or shaft 124 and moving the valve member 122 downwardly and away from the valve seat to permit flow of water therethrough. As illustrated in FIG. 3, when the tractor approaches a standpipe, the downwardly curved ends 116 and upwardly curved ends 104 of the guides 112 and 102, respectively, will assure that the wheel 128 will be received between the guides 112 and 102. Normally, the wheel 128 will be below the horizontal plane of the lower guide 112 and as the downwardly curved end 116 engages the wheel 128, it will be elevated to the level of the lower guide 112 thus causing the valve 122 to open and water to exit from the standpipe 40 onto the inclined surface of the lower guide 112 and then into the tank 94. The distance between adjacent standpipes 38 is less than the distance between the ends of the tank thus assuring that at least one standpipe is feeding water into the tank at all times.

Figure 6:
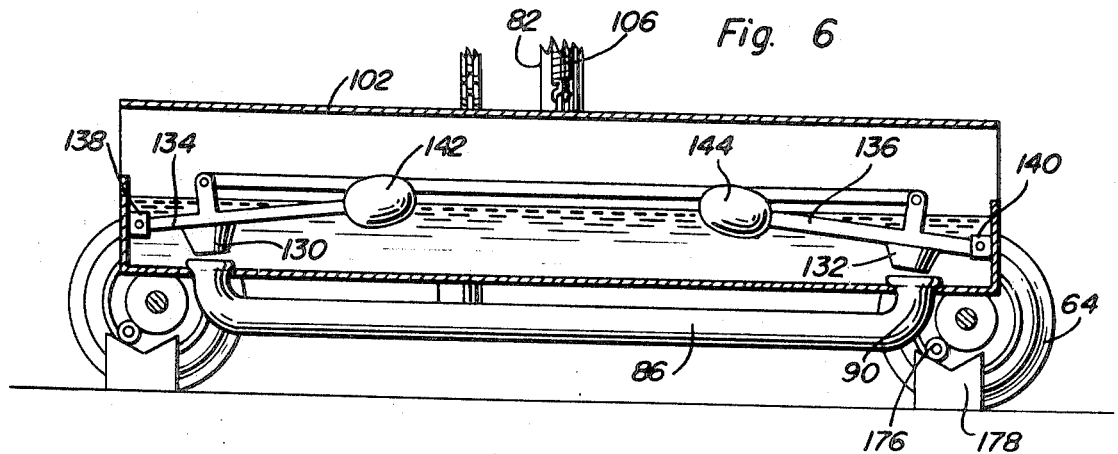
FIG. 6 is a detailed sectional view taken substantially upon a plane passing along section line 6—6 of FIG. 4 illustrating the construction of the water tank and the float valves at each end thereof.
Figure 7:
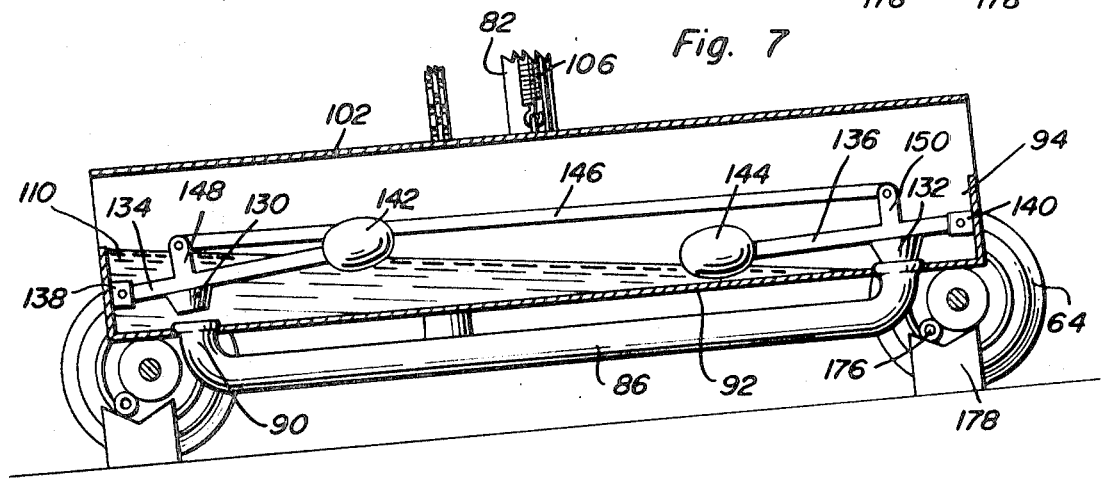
FIG. 7 is a sectional view similar to FIG. 6 but illustrating the action of the float valves when the water tank is tilted so that one end of the tank has substantially no water therein.

Disposed within the tank 94 is a pair of valves 130 and 132 which engage into the upper ends of the upturned ends 90 of the manifold 86 as illustrated in FIGS. 6-8. Each of the valves 130 and 132 is mounted on a support arm 134 and 136 respectively with one end of the support arm being pivotally attached to brackets 138 and 140 on the end walls of the tank 94. The inner end of the support arm 134 is provided with a float 142 and the inner end of the arm 136 is provided with a similar float 144 which renders the valves 130 and 132 responsive to the quantity of water 110 in the tank so that in the event the tank tilts in a longitudinal direction as illustrated in FIG. 7, the float valve at the uphill end of the tank will be closed as illustrated in FIG. 7 when the water 110 runs to the downhill end of the tank which in effect causes the downhill float valve to open even wider. The float valves 130 and 132 are interconnected by an elongated link 146 which is pivotally connected to upstanding brackets 148 and 150 on the arms 134 and 136 respectively. This construction assures that the top valve will close and the pump will pick up water from the lower end of the tank and will not pump air which would occur if the upper float valve remained open when all of the water in the tank was at the downhill end thereof. The manifold 86 is rigidly associated with the tank and vertical movement of the tank due to the variation in weight of the water is permitted by the flexible coupling or couplings 88 in the intake line 84 between the manifold 86 and the pump 80. Thus, there will always be a supply of water from at least one standpipe into the tank and water will be supplied to the pump even though the tank may be oriented on a slope due to the float valves oriented in each end of the tank.

Each of the carriers 26 is driven from the prime mover 66 and is reversed by the reversible transmission 68 by the use of a drive assembly extending from the shaft 70. A longitudinally extending drive shaft 152 extends parallel to the irrigation pipe 42 in adjacent relation thereto and is provided with a universal joint 154 generally in alignment with each flexible coupling 58. The drive shaft 152 is drivingly connected to the drive shaft 70 in any suitable manner such as by the use of a gear box 156 and a chain drive 158 extending to and drivingly connected to the drive shaft 70. However, a vertical drive shaft could extend between the gear box 156 and a corresponding gear box incorporated into the drive shaft 70 so that the drive shaft 152 will be rotated in the same direction and speed as the shaft 70 so that the carriages will move at the same speed as the tractor. As illustrated in FIG. 4, the gear box 156 is supported by a suitable bracket 158 attached to the discharge pipe 82 and the adjacent section of irrigation pipe 42 and additional supports may be provided along the pipe 42 if required but each carriage is provided with a support by virtue of the drive shaft 152 extending into a gear box 162 at each carriage.

Each carriage 26 includes a generally upright triangular frame 164 having the irrigation pipe 42 supported at the apex thereof and the gear box 162 supported on a frame member 166 adjacent the upper end thereof. Drive wheels 168 are journaled on each corner of the triangular frame 164 and are driven from a longitudinal drive shaft 170 through a gear box 172 at each end thereof which is in the form of a worm gear drive. A driving connection is provided between the gear box 162 and the shaft 170 and a chain drive 174 has been illustrated for this purpose but it is pointed out that a drive shaft could interconnect the gear box 162 and a corresponding gear box on the shaft 170 for driving the wheels 168 in a manner similar to that disclosed in my copending application, Ser. No. 838,089, filed July 1, 1969, for Linear Irrigation System with Pickup Shoe.

The driving wheels 168 on the carriages 26 and the driving wheels 64 on the tractor are retained in timed relation by a cam timing mechanism in the form of a laterally projecting lug or roller 176 on each wheel 64 and 168 which engages a stationary cam member 178 having a V-shaped notch 180 in the upper edge thereof so that the projection or lug 176 will reach the bottom of the V-shaped recess at the same time. The upstanding cam members 178 are mounted on plates 182 or the like oriented in longitudinal alignment in the field 22 as illustrated in FIG. 2. The cam members 178 may be transversely aligned or staggered and operate in the same manner as the cam timing structure disclosed in my copending application Ser. No. 838,089, filed July 1, 1969, for Linear Irrigation System with Pickup Shoe.

Figure 9:
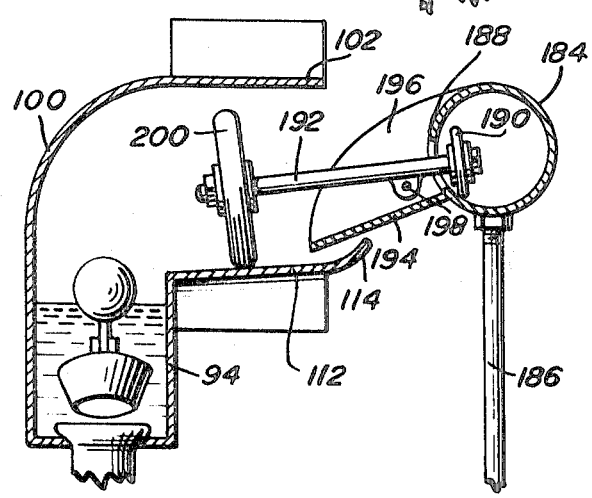
FIG. 9 is a sectional view similar to FIG. 8 but illustrating an arrangement in which an elevated supply pipe is provided with valves thereby eliminating the standpipe construction.

FIG. 9 illustrates a modified form of supply pipe 194 which is supported in elevated relationship to the ground surface by a plurality of vertical support members 186 in the form of anchoring devices. The pipe 184 is provided with a plurality of openings 188 therein which are spaced longitudinally thereof with the inner surface of the pipe peripherally of the opening 188 forming a valve seat for the resilient annular valve member 190 on the end of a pivotally mounted rod or shaft 192 which corresponds with the rod or shaft 124. Extending downwardly and laterally from the bottom of the opening 188 is a chute or guide 194 which extends into overlying relation to the upturned lip 114 on the bottom guide 112. The chute 194 is provided with spaced fore-and-aft walls 196 which provide a mounting for a pivot pin 198 for the rod or shaft 192 and also serves to confine water exiting from the opening 188 so that it will deposit onto the lower guide 112 and be deposited in the tank 94. The free end of the rod or shaft 192 is provided with a spoked wheel 200 which rides on the guide surface 112 and the curved ends thereof to open and close the valve 190 in response to movement of the tank 94 into alignment therewith. This construction eliminates the standpipes and provides a support for the supply pipe 184 in elevated relationship to the ground surface.

The driving and supporting wheels will follow tracks in the ground which may first be made with shallow cultivator shovels and will then become permanent ruts for the wheels to travel in.

The cam aligning means will adjust the alignment at intervals as it becomes necessary to retain the carriages and tractor in alignment to retain the irrigation pipe substantially straight. As pointed out, regardless of whether the riser-type supply pipe is used or the elevated-type supply pipe is used, adjacent points of discharge along the length of the supply pipe will be less than the length of the tank so that there is always water feeding into the tank. The tank itself is floatingly supported on a spring suspension which may be a single spring as illustrated or any variation of spring arrangement as desired which permits the tank to lower due to the weight of water and rise as the water is pumped out. The guides on the tank raise and lower the valve arm on the hinged valve to automatically control the inlet of water so an average water level is automatically maintained. In other words, if the tank is full of water or substantially full of water, it will be at a lower elevation than when it is empty or substantially empty. If the tank is at a lower elevation due to it being full of water, the lower guide will not open the inlet valve thus maintaining the water level in the tank within certain average limits which not only makes the pump operate more efficiently but also reduces the possibility of wasting water. The float valve provided on each end of the tank and the manifold below the tank connecting the two and connected to the intake of the centrifugal pump eliminates the possibility that the pump will take in air from one of the inlet points in the tank when the tank is being operated on a slope which would normally cause all of the water to run to one end of the tank. When this occurs, the float valve on the upper end of the tank is closed while the float valve at the lower or downhill end of the tank remains open thus eliminating the possibility that the pump would take in air which would occur if the float valve at the uphill end of the tank was omitted.

The reversing stakes can be set anywhere to automatically reverse the irrigation device and cause the irrigation device to oscillate back and forth between the stakes. The degree of slope on the inlet for the water into the tank may be varied and constructed of any suitable relatively lightweight material. The various drive mechanisms may be chain drives, drive shafts, drive cables or the like and where necessary, suitable bracing features, lubrication features and the like may be incorporated into the structure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

what is claimed as new is as follows:

1. An irrigation device comprising a mobile sprinkling device including a pump and sprinkler assembly, a water supply tank mounted on said sprinkling device in communication with the pump whereby operation of the pump will pump water from the tank to the sprinkler assembly, a water supply pipe extending in the path of movement of the sprinkling device and including means discharging water into the tank at a plurality of spaced points along the supply pipe during movement of the sprinkling device thereby replenishing the supply of water in the tank as it moves along the pipe, said sprinkling device including a supporting frame, spring means supporting said tank from the frame for vertical movement of the tank in response to the weight of water disposed therein whereby the tank will be in an elevated position when very little water is disposed therein and the tank will be at a lower position when the tank is substantially filled with water, said water discharging means including means controlling flow of water from the supply pipe to the tank and being operative in response to the vertical position of the tank whereby water will be discharged into the tank when it is at an elevated position and not admitted into the tank when the tank is in a lowered position thereby maintaining the water level in the tank between predetermined limits.

2. The structure as defined in claim 1 wherein said supply pipe includes a plurality of vertically and laterally extending standpipes, said means controlling entry of water into the tank including a valve in the upper end of the standpipe, and means on the tank engaging the valve for opening the valve when the tank is aligned with the end of the standpipe and has a predetermined quantity of water therein.

3. The structure as defined in claim 1 wherein said supply pipe is elevated above a supporting ground surface by vertically elongated support means, said supply pipe having a plurality of longitudinally spaced openings therein, said means controlling flow of water from the supply pipe to the tank including valve means associated with each opening and operative to be opened by the tank when a predetermined quantity of water is disposed therein.

4. An irrigation device comprising a mobile sprinkling device including a pump and sprinkler assembly, a water supply tank mounted on said sprinkling device in communication with the pump whereby operation of the pump will pump water from the tank to the sprinkler assembly, a water supply pipe extending in the path of movement of the sprinkling device and including means discharging water into the tank at a plurality of spaced points along the supply pipe during movement of the sprinkling device thereby replenishing the supply of water in the tank as it moves along the pipe, said tank being longitudinally elongated, both ends of said tank being communicated with the pump, and a float valve assembly associated with each end of the tank for closing off the communication with the pump when the water level drops below a predetermined elevation thereby preventing intake of air by the pump when the tank is disposed on a slope with substantially all of the water in one end thereof.

5. The structure as defined in claim 4 wherein said sprinkling device includes a power source thereon and a drive train driven thereby, said drive train including a reversible drive transmission having a trip lever extending therefrom, and means associated with an area to be irrigated to engage the trip lever to reverse the direction of movement of the sprinkling device so that the sprinkling device may be driven back and forth on an area to be irrigated.

6. An irrigation device comprising a mobile sprinkling device including a pump and sprinkler assembly, a water supply tank mounted on said sprinkling device in communication with the pump whereby operation of the pump will pump water from the tank to the sprinkler assembly, a water supply pipe extending in the path of movement of the sprinkling device and including means discharging water into the tank at a plurality of spaced points along the supply pipe during movement of the sprinkling device thereby replenishing the supply of water in the tank as it moves along the pipe, said sprinkling device including an elongated irrigation pipe, a plurality of carriers supporting said irrigation pipe, a tractor supporting a central portion of the irrigation pipe and including the water tank mounted thereon, and drive means on the tractor and drivingly connected to each carrier for driving all of the carriers and the tractor at substantially the same speed, each carrier and said tractor including drive wheels, each drive wheel having a laterally extending lug thereon, and a plurality of ground supported cam devices adapted to engage the lugs in a manner to cause the tractor and carriers to be driven at the same speed.

7. The structure as defined in claim 6 wherein each carrier includes a vertically disposed substantially triangular frame having the irrigation pipe mounted at the upper apex thereof, the drive wheels being disposed at each lower end of the triangular frame, and drive means mounted on said frame intermediate the wheels and being drivingly connected thereto 8. The structure as defined in claim 7 wherein said irrigation pipe includes an elongated sectional pipe having flanged couplings therein, each of said flanged couplings including a pair of opposed flanges having aligned substantially semicircular grooves therein, and an O-ring seal disposed in the grooves for effectively sealing the couplings.

9. The structure as defined in claim 8 wherein the pipe sections are provided with flexible couplings therein to enable articulate movement between adjacent pipe sections to enable the carriers and tractor to move over uneven terrain.

10. A mobile sprinkling device comprising frame means, a sprinkler assembly operatively associated therewith, and a water tank mounted on said frame means for supplying water to the sprinkler assembly and receiving water at a plurality of stations along the path of movement thereof, said water tank being elongated and spanning two stations along the path of movement thereof thereby assuring a supply of water to the tank, and float controlled valve means at remote positions in the tank to communicate the tank with the sprinkler assembly when the sprinkler device is on a slope to assure water being supplied to the sprinkler assembly from the downhill valve means when the up hill valve means is out of the water in the tank.

11. In an irrigation device for traversing an area to be irrigated, a plurality of alignment means disposed in linear spaced relation from end to end of the area to be irrigated for engagement with support means for the irrigation device for retaining the irrigation device in substantially straight condition as it traverses the area to be irrigated.